July 3, 1928.  1,676,037
G. LOWKRANTZ
FILM MOVING MECHANISM
Filed Feb. 18, 1927
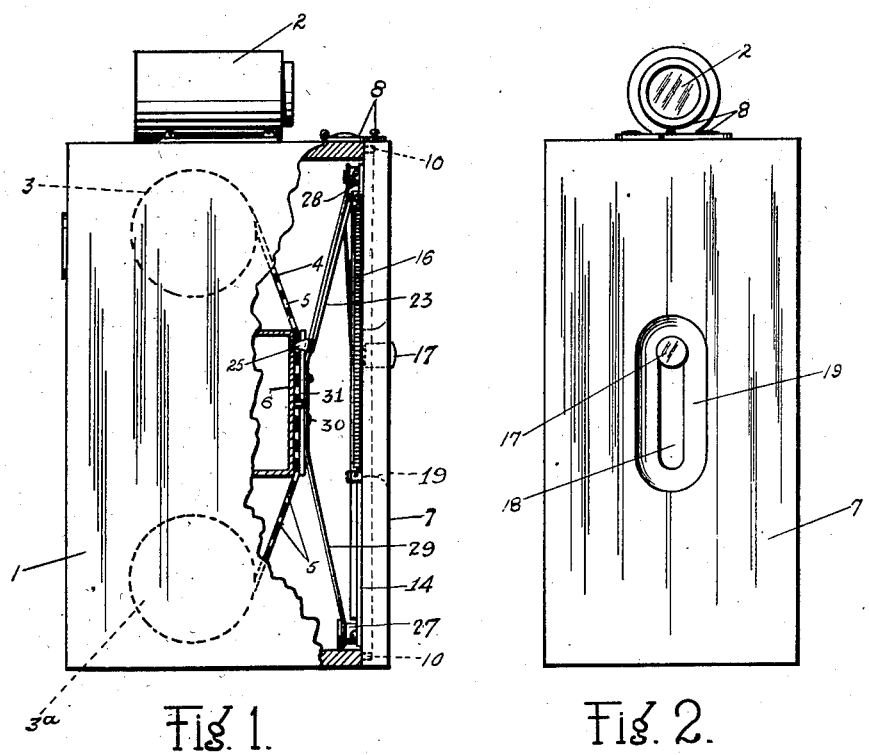
Fig. 1.   Fig. 2.
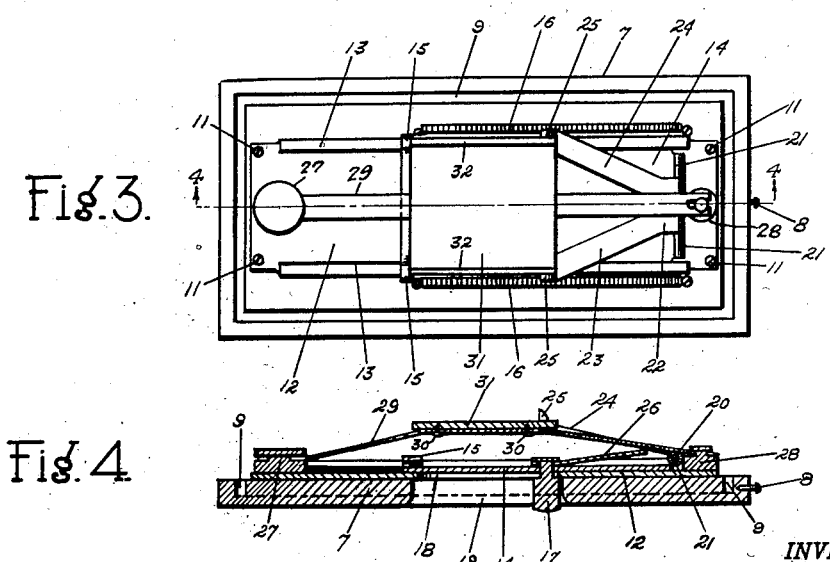
Fig. 3.
Fig. 4.
INVENTOR
GUNNE LOWKRANTZ
BY
ATTORNEY Patented July 3, 1928.

1,676,037

UNITED STATES PATENT OFFICE.

GUNNE LOWKRANTZ, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

FILM-MOVING MECHANISM.

Application filed February 18, 1927. Serial No. 169,376.

My invention relates generally to cameras and particularly to a film moving mechanism therefor, which is hand operated and which is simple in construction, of few parts, readily assembled and positive in operation.

The primary object of my invention is to provide a claw movement for winding a strip of perforated film through a camera by hand, which movement is preferably mounted on the inner side of the camera back and provided with an operating member extending through the back for ready manipulation by the finger of the operator.

Another object is to combine with this improved film moving device, a pressure pad which likewise forms a guide for the claw mechanism.

Still another object lies in the provision of means for normally forcing the claw member of the mechanism into engagement with the film but which will permit the withdrawal of the claws from the film on the return movement of the mechanism.

Other objects and advantages in details of construction and operation will be apparent as the description proceeds, reference now being had to the figures of the drawing wherein like reference numerals indicate like parts.

In the drawing:—

Figure 1 is a side view of a camera equipped with my improved film moving mechanism, certain parts being broken away for clearness of illustration.

Figure 2 is a rear view of the camera.

Figure 3 is a plan view of the inner face of the camera back upon which my film moving mechanism is mounted.

Figure 4 is a cross sectional view taken on the line 4—4 of Figure 3.

The reference numeral 1 indicates generally a camera provided with a view finder 2 and of course the usual lens and shutter mechanism (not shown).

Within the camera there are provided suitable film spools or receptacles indicated in dotted lines 3 and 3ª, which may be of varied construction to suit the type of the particular camera in which they are to be used. Suffice it to say that normally the upper reel 3 is wound with photographic film, in this instance perforated motion picture film indicated at 4, the perforations being shown at 5. This film 4 is threaded downwardly past a guide member or gate 6 at which point the exposure may be made upon the film in the usual manner. After leaving this gate 6, the film is wound up on the bottom reel 3ª.

As before stated, my invention comprises a novel means for moving the film 4 downwardly from one reel to another past the exposure gate 6. This means will now be described.

The camera 1 is provided with a removable back 7 adapted to be secured in position on the camera by means of the catch 8. This back 7 is provided on its inner face adjacent its edges with a groove 9 adapted to receive a tongue 10 protruding from the rear of the camera box whereby to form a light tight connection between the back 7 and camera.

Secured to the inner face of the back 7 as by the screws 11 is a supporting plate 12 preferably of flat metal and provided at its side edges with upwardly and inwardly turned flanges 13 forming a slideway for a purpose to be described.

Slidably mounted on the supporting plate 12 between the flanges 13 thereof is a carrier plate 14 provided at one end with laterally extending ears 15, such ears being offset upwardly so as to permit their extending laterally and outwardly over the top of the flanges 13. Secured at one end to the outer free ends of these ears 15 are the coil springs 16 anchored at their opposite ends to the back 7 whereby the slidable carrier 14 is normally held in one position at the upper end of the slideway provided by the supporting plate 12 and flanges 13.

The carrier 14 is provided centrally thereof with a projecting manipulating pin or finger piece 17, secured thereto in any suitable manner, this finger piece projecting through a slot or recess 18 in the supporting plate 12 and through the slot 19 formed in the back 7. The slot 19 is preferably provided with beveled edges whereby to facilitate the ready engagement of the operator's finger with the finger piece 17 projecting therethrough, for manipulation.

It will be observed particularly with reference to Figure 4, that the slot 18 in the supporting plate 12 is at all times effectively covered by the carrier plate 14 which is slidable thereover. This prevents any light entering the camera through the slots 18 and 19.

The upper end of the carrier plate 14 is provided with a pintle 20 journaled in the rolled flanges 21, the latter being preferably integral with the carrier plate, and pivotally mounted on this pintle 20 is one end of a bifurcated claw member 22, the bifurcations 23 and 24 thereof extending angularly outward to a point adjacent the edges of the supporting plate 12 and provided at their free ends with the teeth 25 which, as shown clearly in Figures 1 and 4, have their bottom edges straight and their upper edges bevelled. The free end of the claw member 22, carrying the teeth 25 is normally forced upwardly away from the carrier plate 14 by means of a leaf spring 26 anchored at one end to the carrier plate, preferably by means of the finger piece 17, and having its free end engaging underneath the claw member 22 whereby to rock the same on its pivot 20 and force the teeth 25 upwardly.

Mounted on each end of the supporting plate 12 are the pins 27 and 28, anchored to which is a bowed flat leaf spring 29, secured to the upwardly bowed central portion of which, as by rivets or screws 30, is a presser pad 31. This presser pad 31 is provided at its side edges with upstanding ribs 32 whereby the presser pad will engage the film 4 at its edges only, thereby greatly lessening the likelihood of scratching the film as it is moved between the gate 6 and the presser pad 31.

The teeth 25 of the claw are so proportioned as to lie just outside of the edges 32 of the presser pad, thus guided thereby, and to project beyond such edges a sufficient distance to engage within the perforations 5 of the film 4. It will be understood, therefore, that as the film 4 is threaded over the gate 6 and engaged on the opposite side by the presser pad 31, the teeth 25 will engage within one set of perforations, whereupon as the carrier plate 14 is moved downwardly by means of the finger piece 17, the claw, moving therewith, will move the film past the gate, thus bringing a new section into position for exposure. Obviously, due to the spring 26 bearing against the underside of the claw, the latter is held in its outward position during such downward movement and the straight under edges of the teeth 25 serve as a very positive film moving mechanism.

The movement of the carrier plate 14 and the claw 22 is such that for each downward movement thereof, the film will be moved a distance equal to one exposure. Upon the return movement of the carrier 14 under the influence of the springs 16, the upper bevelled edges of the teeth 25 will engage against the edges of the film 4 forcing the teeth out of engagement with the perforations against the tension of the spring 26. There is no movement, therefore, on the part of the film upon the return stroke of the claw. The pressure of the presser pad 31 against the film, under the influence of the spring 29 is sufficient to hold the film in its adjusted position ready for the next exposure.

It will thus be seen that I have provided a novel and practical film moving mechanism combined with which is a presser pad for the film, serving to hold the film flat against the exposure gate and against accidental movement. Of course, many changes may be made by way of detail without departing from the spirit and scope of my invention. I do not limit myself, therefore, to the exact form shown and described other than by the appended claims.

I claim:—

1. In combination with a camera, a back on said camera, a claw slidable on said back for moving a strip of film in said cameras, and a presser pad on said back for engaging the film and guiding said claw.

2. In combination with a camera, a film gate therein, a removable back on said camera, a film moving claw slidable on said back, and a presser pad on said back for resiliently holding a film against said gate, said presser pad limiting the outward movement of said claw and guiding the same in its sliding movement.

3. In combination with a camera, a film gate therein, a removable back on said camera, a film moving claw slidable on said back, springs normally retaining said claw in one position, means extending through said back for moving said claw against the tension of said springs, resilient means normally urging said claw into film engaging position, and a presser pad holding film against said gate and guiding said claw in its sliding movement.

GUNNE LOWKRANTZ.